US008641090B2

United States Patent
Wipasuramonton et al.

(10) Patent No.: US 8,641,090 B2
(45) Date of Patent: Feb. 4, 2014

(54) OCCUPANT SAFETY SYSTEM

(75) Inventors: Pongdet P. Wipasuramonton, Rochester, MI (US); Jonathan R. Kibat, Warren, MI (US)

(73) Assignee: TK Holdings Inc., Auburn Hills, MI (US)

( * ) Notice: Subject to any disclaimer, the term of this patent is extended or adjusted under 35 U.S.C. 154(b) by 55 days.

(21) Appl. No.: 13/209,284

(22) Filed: Aug. 12, 2011

(65) Prior Publication Data

US 2012/0038137 A1   Feb. 16, 2012

Related U.S. Application Data

(60) Provisional application No. 61/374,128, filed on Aug. 16, 2010.

(51) Int. Cl.
  *B60R 21/18*   (2006.01)
  *B60R 22/195*   (2006.01)
(52) U.S. Cl.
  USPC ........ 280/733; 280/730.2; 280/729; 280/807; 280/805
(58) Field of Classification Search
  USPC ............... 280/733, 730.2, 730.1, 729, 743.1, 280/728.1, 808, 807, 806, 805, 801.1
  See application file for complete search history.

(56) References Cited

U.S. PATENT DOCUMENTS

| | | | | |
|---|---|---|---|---|
| 5,393,091 A | * | 2/1995 | Tanaka et al. | 280/733 |
| 6,135,380 A | * | 10/2000 | Brown | 242/374 |
| 7,481,452 B2 | * | 1/2009 | Itoga et al. | 280/733 |
| 7,871,105 B2 | * | 1/2011 | Itoga | 280/733 |
| 7,883,106 B2 | * | 2/2011 | Mical | 280/733 |
| 7,905,514 B2 | * | 3/2011 | Thomas | 280/733 |
| 2002/0067031 A1 | * | 6/2002 | Busgen et al. | 280/733 |
| 2007/0080528 A1 | * | 4/2007 | Itoga et al. | 280/733 |
| 2010/0156084 A1 | * | 6/2010 | Nezaki | 280/806 |

* cited by examiner

*Primary Examiner* — Keith Frisby
(74) *Attorney, Agent, or Firm* — Foley & Lardner LLP

(57) ABSTRACT

An occupant restraint system comprising a seat belt webbing having a first end and a second end, the webbing configured to restrain the occupant; a member for anchoring the second end of the webbing; and an inflatable pretensioner having an inflator and an inflatable cushion that includes a first inflatable chamber and a second inflatable chamber, wherein the inflator is configured to inflate the first and second chambers of the cushion; wherein the first inflatable chamber is configured to deploy upon inflation to provide pretensioning of the webbing to restrain the secured occupant; wherein the second inflatable chamber is configured to deploy upon inflation to restrain the occupant.

19 Claims, 13 Drawing Sheets

OCCUPANT SAFETY SYSTEM

CROSS-REFERENCE TO RELATED PATENT APPLICATIONS

This application claims priority to and the benefit of U.S. Provisional Patent Application No. 61/374,128 filed on Aug. 16, 2010. The foregoing provisional application is incorporated by reference herein in its entirety.

BACKGROUND

The present application relates generally to the field of occupant restraint or safety systems. More specifically, this application relates to an active occupant restraint system configured to include an inflatable pretensioner to provide pretensioning to a webbing of the active occupant restraint system.

SUMMARY

According to a disclosed embodiment, an occupant restraint system is configured to provide restraint to an occupant of a vehicle. The occupant restraint system includes a seat belt webbing having a first end and a second end, the webbing configured to restrain the occupant; a member for anchoring the second end of the webbing; and an inflatable pretensioner having an inflator and an inflatable cushion that includes a first inflatable chamber and a second inflatable chamber. The inflator is configured to inflate the first and second chambers of the cushion, wherein the first inflatable chamber is configured to deploy upon inflation to provide pretensioning of the webbing to restrain the secured occupant and wherein the second inflatable chamber is configured to deploy upon inflation to restrain the occupant.

According to another disclosed embodiment, an inflatable pretensioner is configured to pretension a seat belt webbing of an occupant restraint system to thereby improve restraint of an occupant secured thereto. The inflatable pretensioner includes an inflatable cushion that includes at least one inflatable chamber and at least one non-inflatable portion, and an inflator for inflating the at least one chamber of the cushion. The at least one non-inflatable portion includes a first aperture and a second aperture, wherein the webbing passes through the first and second apertures to slideably couple the cushion to the webbing, such that the orientation of the webbing in a direction transverse to the length of the webbing is maintained relative to the at least one chamber, and wherein inflation of the at least one inflatable chamber provides pretensioning of the webbing to restrain the secured occupant.

DETAILED DESCRIPTION

Figure 2:
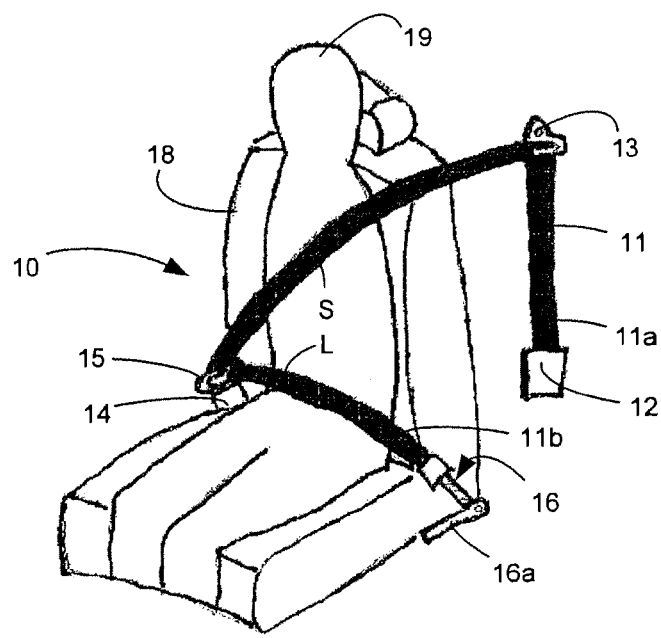
FIG. 2 is a perspective view of a seat system configured to include a conventional active occupant restraint system having a conventional pretensioner.

Active occupant restraint systems provide restraint to secured occupants generally seated in seat systems of vehicles. As shown in FIG. 2, a conventional active occupant restraint system 10 may include a seat belt webbing 11, a retractor mechanism 12, a D-ring 13, a buckle mechanism 14, a tongue member 15 to selectively engage the buckle mechanism 14, and an anchor assembly 16 having a conventional pretensioner 16a. The seat belt webbing 11 may be made from a flexible woven nylon mesh to include a first end 11a to couple to the retractor mechanism 12 and a second end 11b to couple to the anchor and pretensioner assembly 16. Between the first and second ends 11a, 11b, the webbing 11 may route through the D-ring 13 configured to couple to the vehicle (e.g., B-pillar) and the tongue member 15, such that the webbing 11 is slideably coupled to the tongue member 15 and D-ring 13. The portion of the webbing 11 between the D-ring 13 and the tongue member 15 forms a torso (e.g., shoulder) portion S, which routes over the torso of the occupant 19 to provide active restraint to the occupant 19 by restraining the chest or torso of the occupant during a vehicle dynamic event (e.g., a frontal impact). The portion of the webbing 11 between the tongue member 15 and the anchor and pretensioner assembly 16 forms a lap portion L, which routes over the lap of the occupant 19 to provide restraint to the occupant 19 by restraining the pelvis of the occupant during a vehicle dynamic event. Typically, during normal operation of the occupant restraint system 10, there is some slack between the occupant 19 and the lap portion L and the shoulder portion S to allow for a higher degree of comfort for the restrained occupant 19.

During a vehicle dynamic event, the conventional retractor mechanism 12 may limit or prohibit the webbing 11 of the active occupant restraint system 10 from extending or extracting (or "paying out"), and may further include a device, such as a pyrotechnic device, to wind or retract the webbing 11 to remove any such slack between the occupant 19 and the shoulder portion S of the webbing 11. Further, during the vehicle dynamic event, the anchor assembly 16 having a conventional pretensioner 16a may include an activating device, such as a pyrotechnic device, that when activated removes the slack between the occupant 19 and the lap portion L of the webbing 11. The conventional pretensioner of the anchor assembly 16 may include a chamber having a piston, whereupon activation of the pyrotechnic, inflation gas is produced and fills the chamber creating pressure that drives the piston in a direction to impart a tension force into the lap portion L of the webbing 11, since the second end 11b of the webbing 11 is anchored to the piston. Thus, the motion of the piston removes the slack between the occupant 19 and the lap portion L of the webbing 11. Reduced slack between the occupant restraint system 10 and the occupant 19 improves occupant safety by allowing for a reduced deflection of the occupant prior to actual restraint, which reduces the momentum of the occupant when restraint occurs, thus reducing the reaction forces into the occupant 19.

With general reference to FIGS. 3-22, disclosed are occupant safety systems configured to provide improved occupant safety by providing pretensioning of the seat belt webbing during a vehicle dynamic event through an inflatable cushion positioned adjacent to the lap portion of the webbing. The occupant safety systems may further integrate an inflatable airbag cushion (e.g., pelvis airbag cushion) to protect the occupant or a portion of the occupant, whereby the occupant safety system provides pretensioning of the seat belt webbing of the active occupant restraint system and also provides passive restraint of the occupant through an inflatable cushion.

Figure 1:
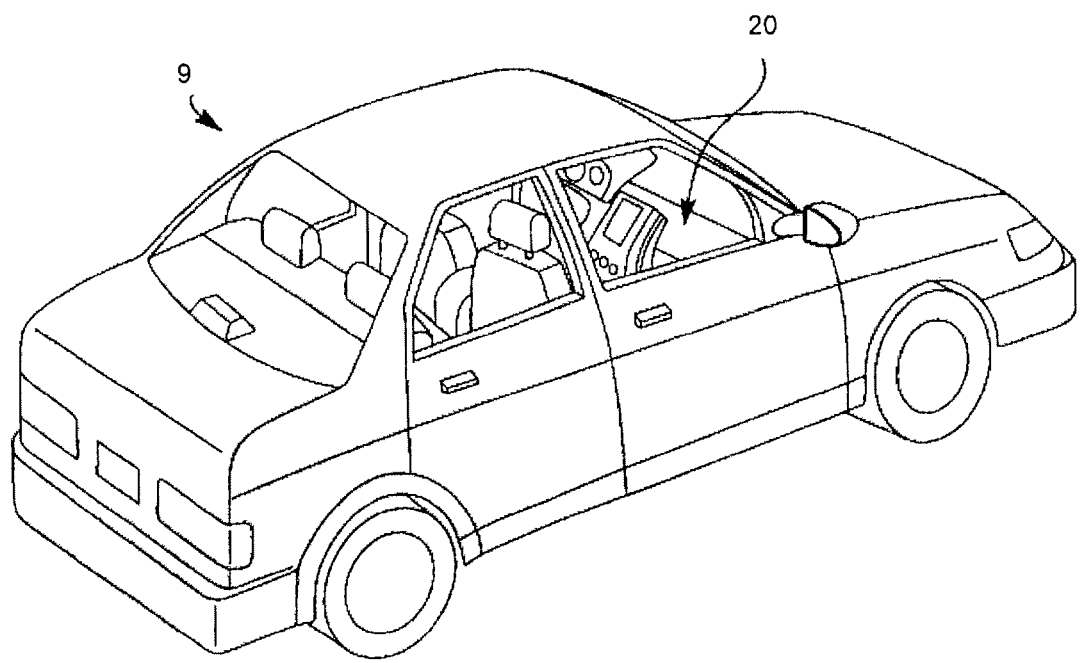
FIG. 1 is a perspective view of a motor vehicle.

FIG. 1 illustrates an exemplary embodiment of a vehicle 9 (e.g., a motor vehicle) that includes a passenger compartment having at least one seat system 18 configured to provide seating to an occupant 19. The vehicle 9 may further include an active occupant restraint system 20, which may be integrated into the seat system (which is to say the occupant restraint system may couple directly to the seat assembly), may operate independent of the seat system (which is to say the occupant restraint system may couple directly to vehicle components other than the seat system), or may be partially integrated and partially independent of the seat system (which is to say the occupant restraint system may couple directly to both the seat system and vehicle components other than the seat system). The occupant safety systems disclosed herein may be configured for use in any vehicle configured to include at least one occupant and the vehicles disclosed herein are not meant as limitations.

Figure 3:
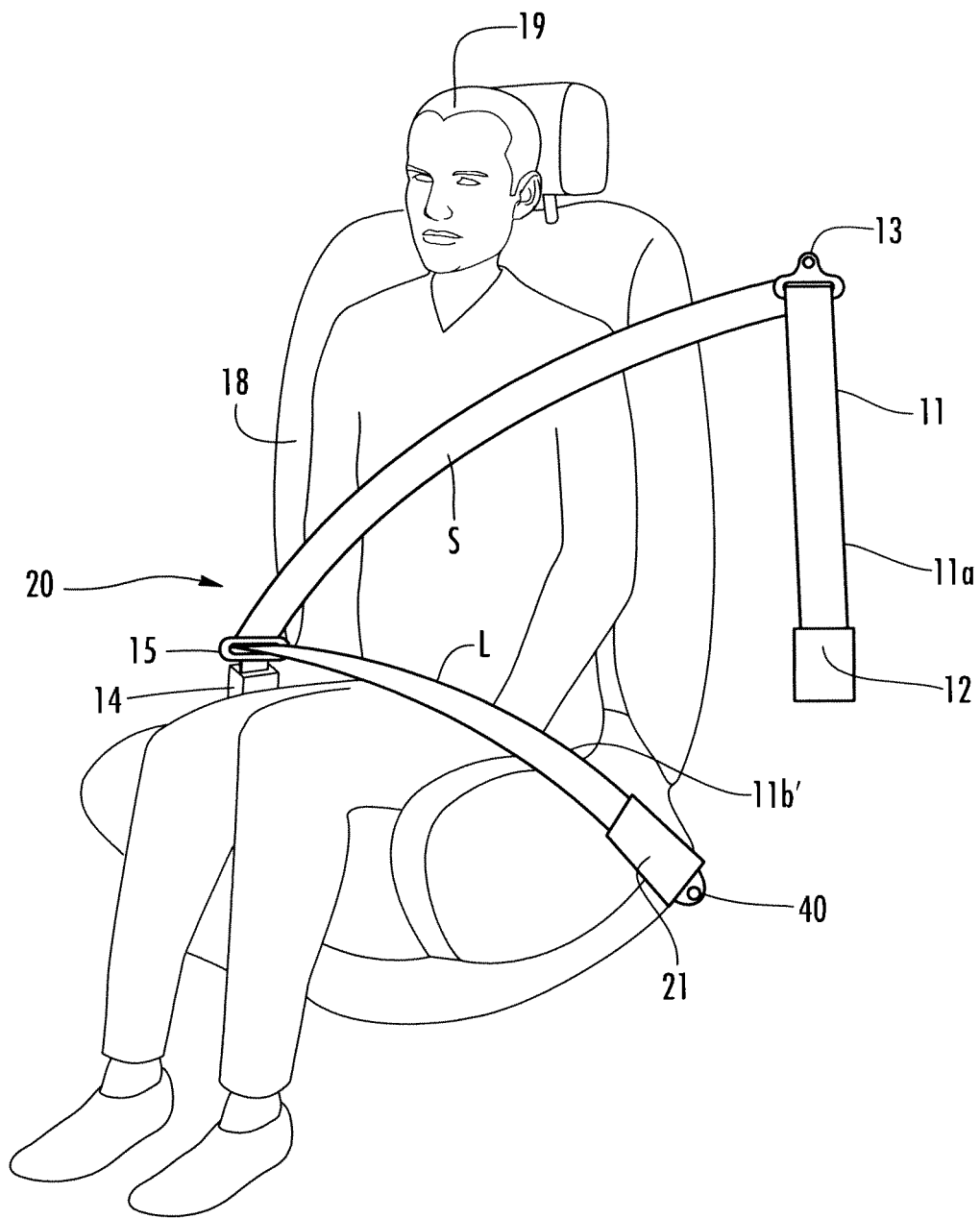
FIG. 3 is a perspective view of an exemplary embodiment of a seat system having an active occupant restraint system including an inflatable pretensioner shown stored or folded and configured for use in a motor vehicle, such as the motor vehicle of FIG. 1.

FIG. 3 illustrates an exemplary embodiment of an active occupant restraint system 20 that is partially integrated and partially independent to a seat system having a seat back and seat cushion. The active occupant restraint system 20 may include a conventional retractor mechanism 12 coupled to the vehicle, a D-ring 13 coupled to the vehicle, a buckle mechanism 14 coupled to the seat cushion, a tongue member 15 to selectively engage the buckle mechanism 14, a member 40 (e.g., an anchor member) coupled to the seat cushion, a seat belt webbing 11, and an inflatable pretensioner 21 (shown stored or undeployed in FIG. 3).

A first end 11a of the webbing 11 may be coupled to the retractor mechanism 12 and a second end 11b' of the webbing 11 may be coupled to the anchor member 40. The webbing 11 may be routed to form a shoulder portion S and a lap portion L. The shoulder portion S may be routed over the shoulder of the occupant 19 to provide restraint to the occupant 19, such as by restraining the chest of the occupant during a vehicle dynamic event (e.g., a frontal impact). The lap portion L may be routed over the lap of the occupant 19 to provide restraint to the occupant, such as by restraining the abdomen of the occupant during a vehicle dynamic event.

A section of the lap portion L of the webbing, such as the section adjacent to the second end 11b', which couples to the anchor member 40, may route through the inflatable pretensioner 21 to maintain proper orientation between the seat belt webbing 11 and the inflatable pretensioner 21, as well as proper orientation relative to the occupant 19, such as proximate to the pelvic region of the occupant 19. The inflatable pretensioner 21 may couple directly to the anchor member 40 thereby fixing the location of the coupled portion of the inflatable pretensioner 21. Alternatively, the inflatable pretensioner 21 may couple directly to the seat system, such as the seat cushion, or to a vehicle component, such as the floor panel thereby fixing the location of the coupled portion of the inflatable pretensioner 21.

Figure 4:
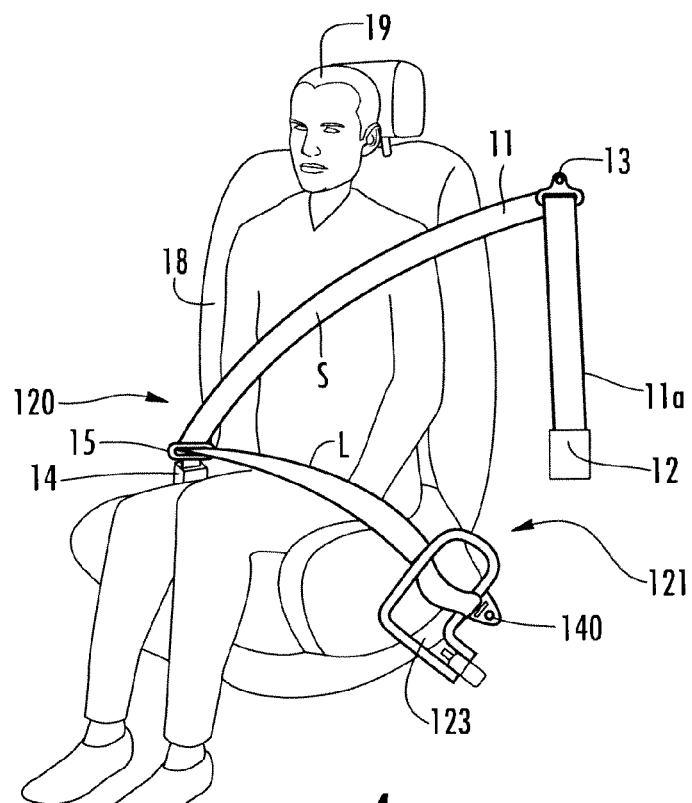
FIG. 4 is a perspective view of an exemplary embodiment of an active restraint system having an integrated inflatable pretensioner that is shown deployed or inflated.
Figure 5:
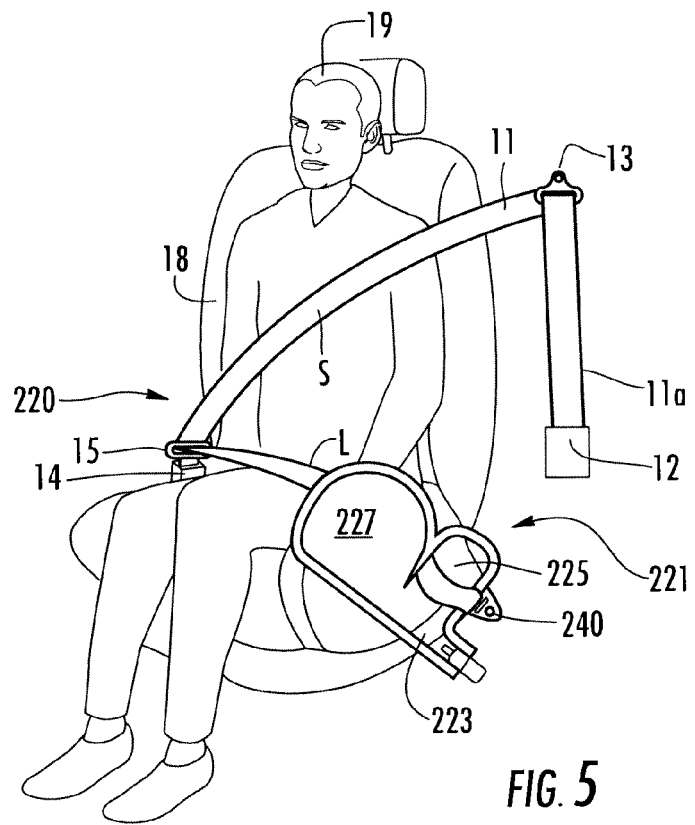
FIG. 5 is a perspective view of another exemplary embodiment of an active occupant restraint system having an integrated inflatable pretensioner and pelvis airbag that is shown deployed or inflated.

FIGS. 4 and 5 illustrate exemplary embodiments of active occupant restraint systems 120, 220 shown partially integrated and partially independent to a seat system. The active occupant restraint systems 120, 220 may be configured as disclosed above in reference to the occupant restraint system 20 shown in FIG. 3, except having the differences described below. As shown in FIG. 4, the inflatable pretensioner 121 may include an inflatable cushion 123 configured to provide pretensioning of the seat belt webbing 11 during a vehicle dynamic event. As shown in FIG. 5, the inflatable pretensioner 221 may include an at least one inflatable cushion 223 configured to provide pretensioning of the seat belt webbing as well as provide restraint to at least a portion of the occupant 19, during a vehicle dynamic event. For example, the inflatable cushion 223 of the inflatable pretensioner 221 may include a first inflatable chamber 225 (e.g., inflatable portion) configured to inflate to provide the pretensioning of the seat belt webbing 11 and may include a second inflatable chamber 227 (e.g., inflatable portion) configured to inflate to provide restraint to the occupant 19, such as the pelvic region of the occupant 19.

FIGS. 6-10A illustrate exemplary embodiments of integrated airbag (e.g., pelvis) and inflatable pretensioner assemblies 221, 321 that include an inflatable airbag cushion 223, 323 and an inflator 222, 322 for inflating the cushion 223, 323. The airbag (e.g., pelvis) and pretensioner assembly 221 may also include a member, such as the member 240 shown in FIG. 8, to couple to the webbing and/or for anchoring the airbag assembly. The seat belt webbing 11 of the occupant restraint system 20 may route through the airbag cushion 223, 323, such as, for example, to couple to the member (e.g., the member 240) to retain the coupled end of the webbing thereto.

Figure 6:
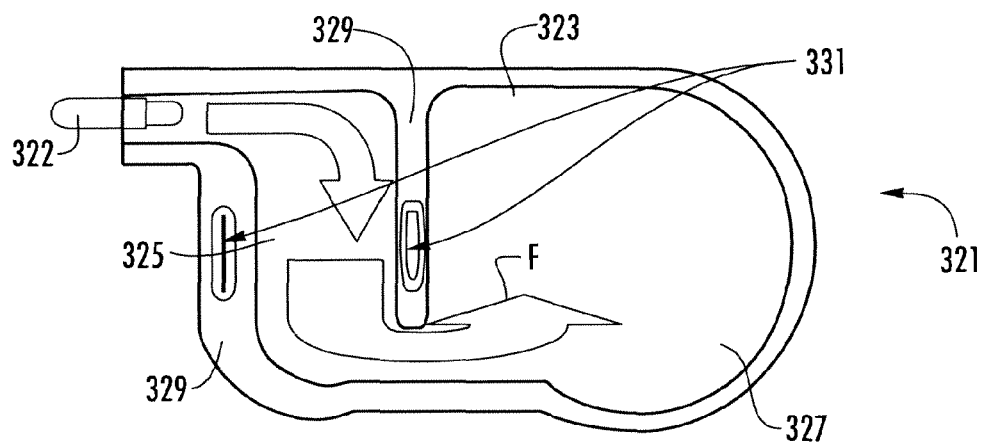
FIG. 6 is a side view of an exemplary embodiment of an integrated airbag (e.g., pelvis) and inflatable pretensioner assembly.

The airbag cushion 223, 323 may be made from one or a plurality of panels made from a flexible woven material (e.g., nylon mesh). The woven panels may be coupled together through conventional methods, such as stitching, to form at least one inflatable portion or chamber 225, 325. As shown in FIG. 6, the airbag cushion 323 may include a first inflatable chamber 325 and a second inflatable chamber 327 that is configured in direct fluid communication with the first chamber 325 to receive inflation gas therethrough. In other words, the inflatable chambers 325, 327 may be positioned in series, where the inflator 322 may couple to the airbag cushion 323 to direct inflation gas (upon activation) into the first inflatable chamber 325 and the inflation gas enters the second inflatable chamber 327 upon exiting the first inflatable chamber 325.

Figure 7:
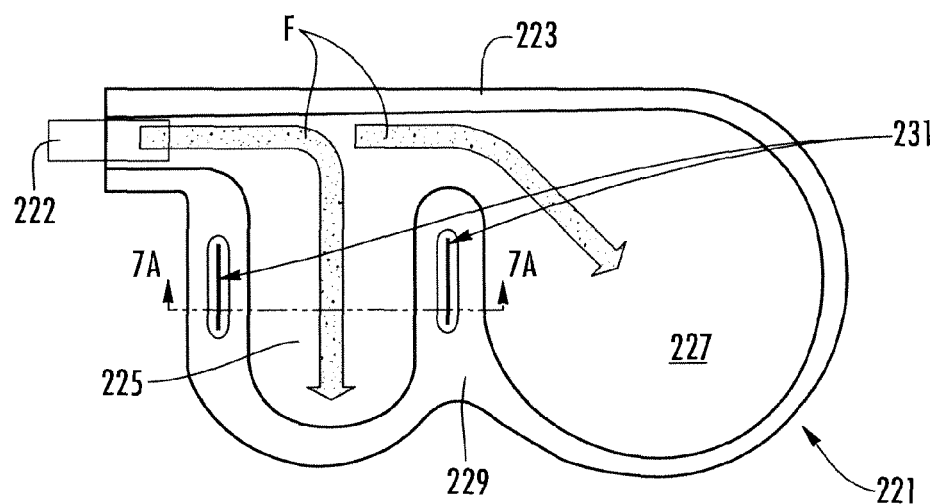
FIG. 7 is a side view of another exemplary embodiment of an integrated airbag (e.g., pelvis) and inflatable pretensioner assembly.
Figure 7A:
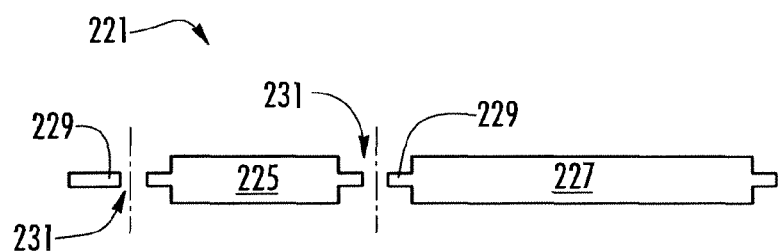
FIG. 7A is a cross-sectional view taken along line 7A-7A of FIG. 7.

As shown in FIG. 7, the airbag cushion 223 may include a first inflatable chamber 225 and a second inflatable chamber 227, wherein the second chamber 227 is configured having indirect fluid communication with the first chamber 225. In other words, the two chambers 225, 227 may be configured in parallel, where the inflator may couple to the airbag cushion 223 to direct inflation gas into the first chamber 225 and/or second chamber 227 without having to previously pass through the other inflatable chamber. This allows for both inflatable chambers 225, 227 to be inflated substantially simultaneously. The airbag 223, 323 configuration may tailor the sequence or function of the integrated airbag (e.g., pelvis) and inflatable pretensioner assemblies 221, 321 of the occupant restraint system 20. For example, the configuration of FIG. 6 drives inflation of the first inflatable chamber 225 prior to inflation of the second inflatable chamber 227, thus, providing pretensioning, such as through inflation of the first chamber 225, earlier in the deployment sequence relative to the protection of the occupant, such as through inflation of the second chamber 227 to restrain and protect the pelvic region of the occupant.

The airbag cushion 223, 323 of the integrated airbag (e.g., pelvis) and inflatable pretensioner assemblies 221, 321 may further include one or a plurality of non-inflatable portions 229, 329. The non-inflatable portions 229, 329 may be configured to divide the airbag cushion 223, 323 into one or more inflatable chambers. For example, the non-inflatable portion 229 may divide the airbag cushion 223 into first and second chambers 225, 227 that are in indirect fluid communication. As another example, the non-inflatable portion 329 may divide the airbag cushion 323 into first and second chambers 325, 327, where the second chamber 327 is in direct fluid communication with the first chamber 325.

Figure 17:
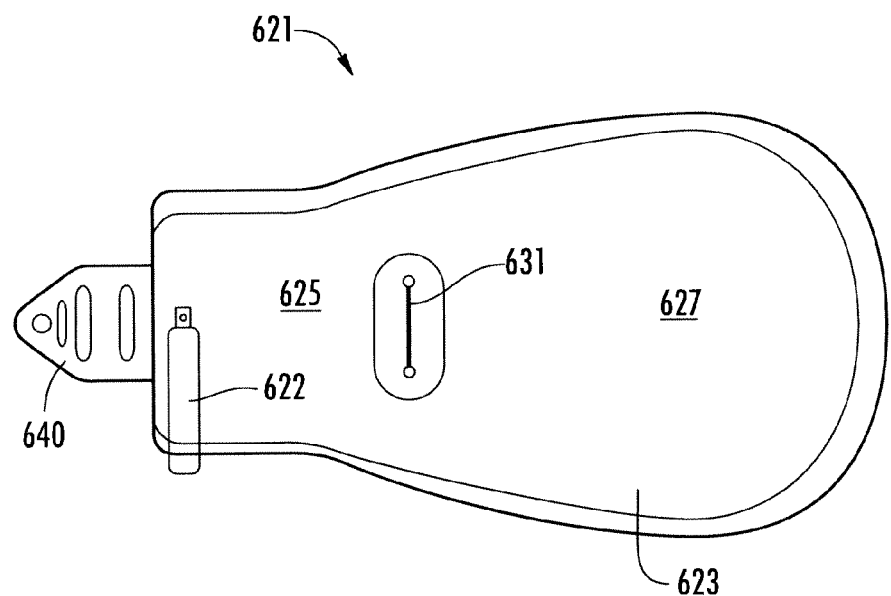
FIG. 17 is a side view of another inflatable pretensioner, shown without the webbing coupled thereto.
Figure 18:
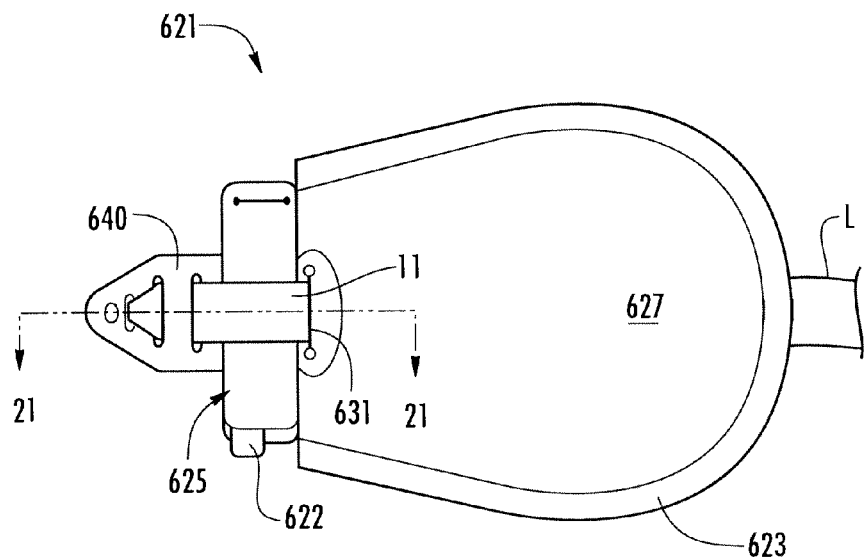
FIG. 18 is a side view of the inflatable pretensioner of FIG. 17 with the first inflatable chamber shown in the stored configuration and with the webbing coupled to the member and slideably coupled to the cushion.
Figure 19:
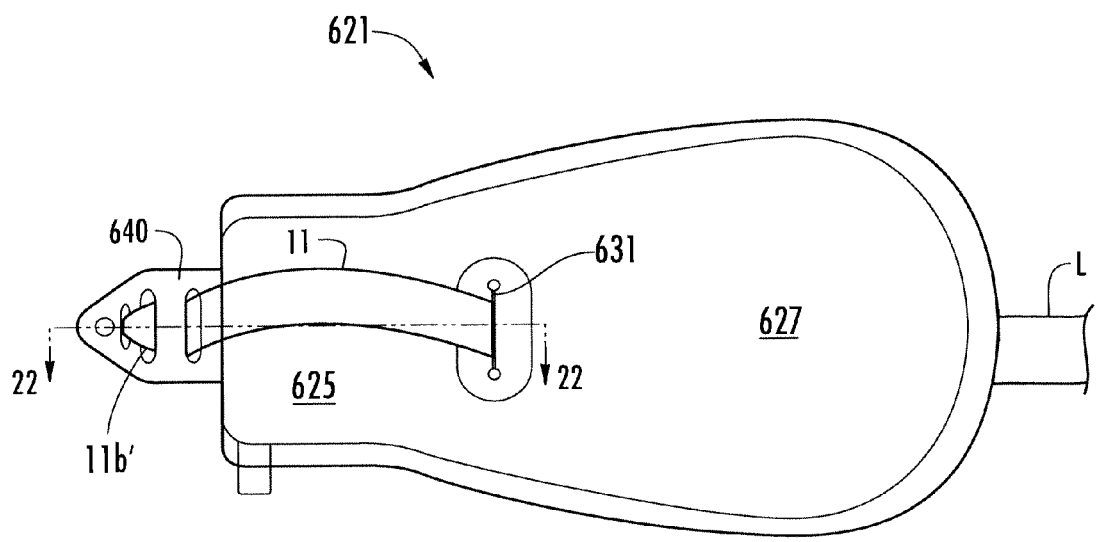
FIG. 19 is a side view of the inflatable pretensioner of FIG. 18 showing the first inflatable chamber deployed or inflated.

The airbag cushion may include one or more apertures or slits that may be located on a non-inflatable portion, an inflatable portion, or a combination thereof. The apertures or slits may be configured to receive the webbing of the occupant restraint system to slideably couple the webbing and the inflatable pretensioner. As shown in FIGS. 17 and 19, the airbag cushion 623 may include one aperture 631 that may be provided between a first inflatable chamber 625 and a second inflatable chamber 627, wherein the webbing 11 may pass through the aperture 631 (as well as through the openings of the member 640) to slideably couple the webbing and the inflatable pretensioner 621. As shown in FIGS. 6 and 7, the airbag cushions 223, 323 (e.g., the non-inflatable portions 229, 329) may include a plurality of apertures 231, 331 (e.g., slits), wherein each aperture 231, 331 may allow for the seat-belt webbing to pass therethrough to couple (e.g., slideably couple) the cushion and webbing. The size, shape, and location of the apertures 231, 331, 631 may vary and preferably are tailored to the width and thickness of the seat belt webbing to maintain a proper orientation of the inflatable pretensioner. As shown in FIGS. 6 and 7, the airbag cushion 223, 323 may include two apertures 231, 331 provided in non-inflatable portions 229, 329, where the two apertures 231, 331 are located on opposing sides of the first inflatable portion 225, 325. This configuration slideably couples the airbag cushion 223, 323 to the webbing 11. Thus, the section of the webbing 11 that passes through one or both apertures 231, 331 may change, such as during pretensioning of the webbing 11 by the assemblies 221, 321, while maintaining an orientation of the webbing in a direction that is transverse to the length of the webbing 11 relative to the cushion 223, 323. This helps maintain the proper location of the cushion 223, 323 relative to the webbing 11 and/or secured occupant.

Figure 22A:
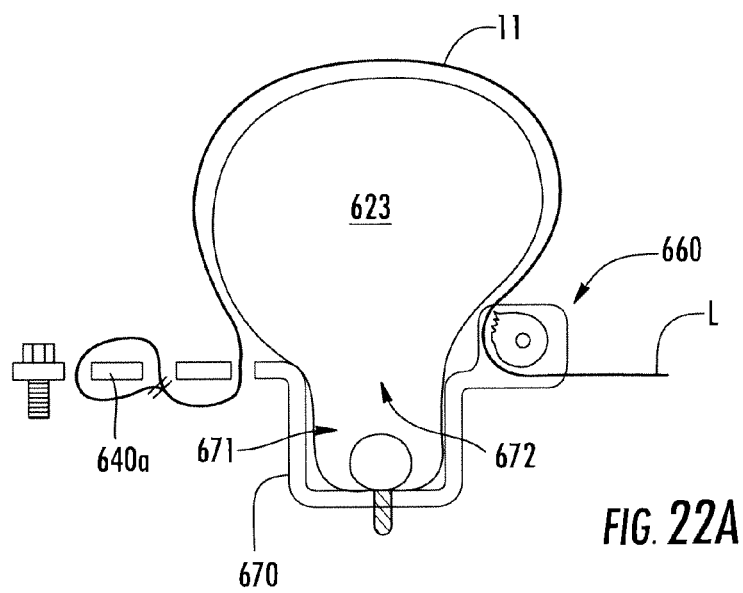
FIG. 22A is a cross-sectional view taken along line 22-22 of FIG. 19, showing an exemplary embodiment of an inflatable pretensioner.
Figure 22B:
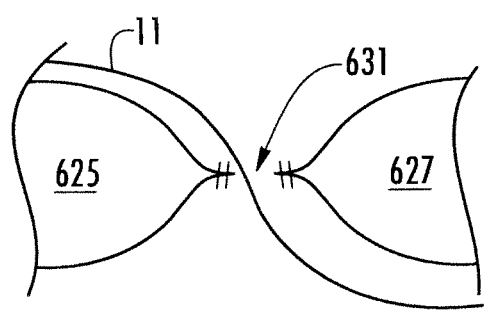
FIG. 22B is another cross-sectional view taken along line 22-22 of FIG. 19, showing another exemplary embodiment of an inflatable pretensioner.
Figure 22C:
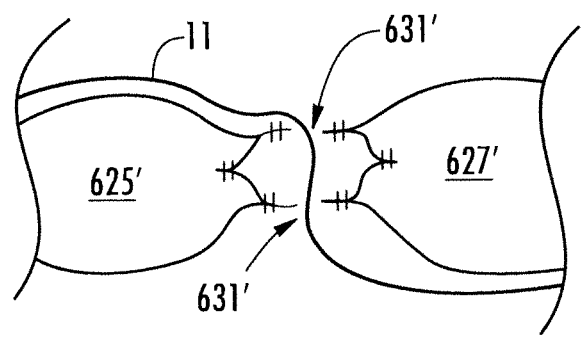
FIG. 22C is yet another cross-sectional view taken along line 22-22 of FIG. 19, showing yet another exemplary embodiment of an inflatable pretensioner.

As shown in FIG. 22B, the airbag cushion 623 may include an inner panel and an outer panel that are coupled together, such as through stitching, to define the first inflatable chamber 625 and the second inflatable chamber 627. This configuration forms one layer of cushion 623 that the aperture 631 may be provided therethrough. Accordingly, the webbing 11 may pass through the one aperture 631 in the single layer of the cushion 623 to slideably couple the cushion to the webbing. Alternatively, as shown in FIG. 22C, the airbag cushion 623 may include a plurality of panels, such as an inner panel, an outer panel, and one or more intermediate panels. The intermediate panels may be provided between and coupled to the inner and outer panels to form an airbag cushion 623 that defines the first and second inflatable chambers 625', 627' and forms more than one layer of the cushion 623 in the region where the apertures 631' are located. The cushion 623, shown in FIG. 22C, having two layers of cushion between the inflatable chambers 625', 627' includes an aperture 631' in each layer. Accordingly, the webbing 11 may pass through both apertures 631' in the cushion to slideably couple the cushion to the webbing. This configuration may provide additional support to better maintain the relative orientation between the inflatable pretensioner and the webbing 11 and/or may provide additional pretensioning of the webbing, such as during deployment of the first inflatable chamber 625'.

Figure 8:
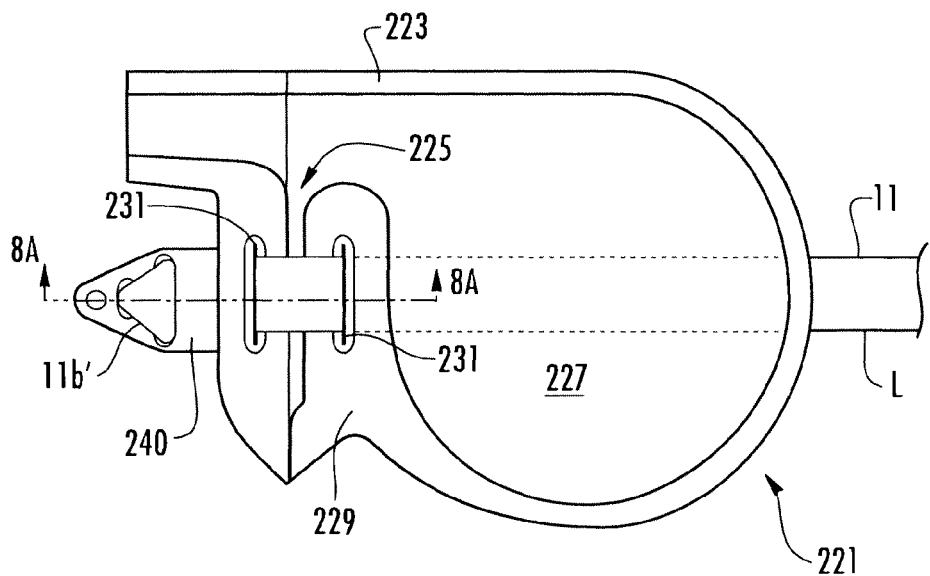
FIG. 8 is a side view of an exemplary embodiment of an integrated airbag (e.g., pelvis) and inflatable pretensioner assembly.
Figure 8A:
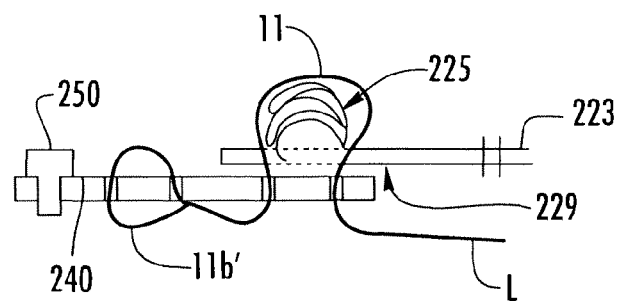
FIG. 8A is a cross-sectional view taken along line 8A-8A of FIG. 8.

The airbag cushion or any inflatable chamber, such as the first inflatable chamber 225, of the cushion 223 may be packaged for storage through a series of rolls and/or folds, such as shown in FIG. 8A. The airbag cushion 323 may include one or a plurality of fastening devices, such as tack-stitches, to maintain the stored (e.g., folded and/or rolled) configuration of the inflatable chamber 225 of the airbag cushion 223, during assembly and prior to deployment. The fastening device may be configured to break loose or tear when subjected to a relatively low tension force. Thus, the fastening device may maintain the stored configuration of the airbag cushion 223, but may tear during deployment when subjected to a relative low tension force, so as not to impede or alter deployment of the airbag cushion 223.

Further, as shown in FIGS. 8 and 8A, the seat belt webbing 11 may route from the side of the airbag cushion 223 that is opposite the side having the stored first inflatable chamber 225 through a first opening 241 (e.g., aperture) in the member 240 and a first aperture 231 in the cushion 223 to the side of the airbag cushion 223 having the stored first inflatable chamber 225, where the webbing 11 may pass over the stored first inflatable chamber 225, then the webbing may pass through a second aperture 231 in the cushion 223 and a second opening 242 (e.g., aperture) in the member 240, then may route adjacent to the member 240 on the side of the cushion 223 that is opposite to the stored first inflatable chamber 225. The end 11*b*' of the webbing 11 may be fixed. For example, the end 11*b*' of the webbing 11 may form a loop around the member 240 by passing through third and fourth openings 243, 244 (e.g., apertures) in the member 240, whereby the end 11*b*' of the webbing 11 may be coupled (e.g., by stitching) to a portion of the webbing 11, which fixes the webbing 11 to the member 240. The webbing 11 may also be coupled directly to the member 240 without the webbing 11 forming a loop, such as, for example, by having a fastener (e.g., rivet, screw, bolt, etc.) couple the webbing 11 to the member 240. The airbag cushion 223 may be coupled directly to the member 240 and/or the webbing 11 (which may pass through apertures/openings in both the cushion and the member) to help maintain proximity and orientation of the cushion 223 relative to the member 240, the webbing 11, and/or the secured occupant.

Figure 9:
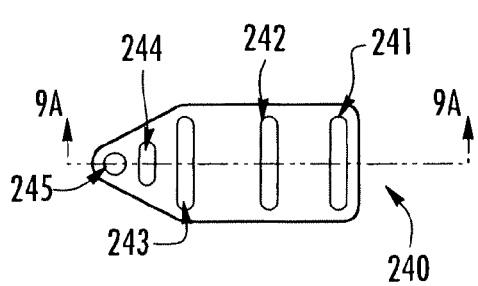
FIG. 9 is a side view of an exemplary embodiment of a member for use in an integrated inflatable pretensioner and pelvis assembly.
Figure 9A:
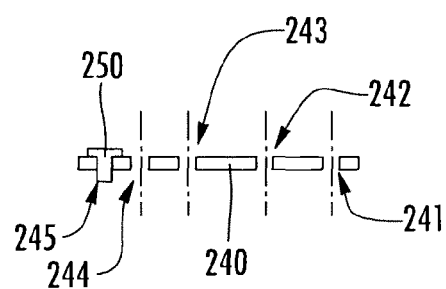
FIG. 9A is a cross-sectional view taken along line 9A-9A of FIG. 9.
Figure 10:
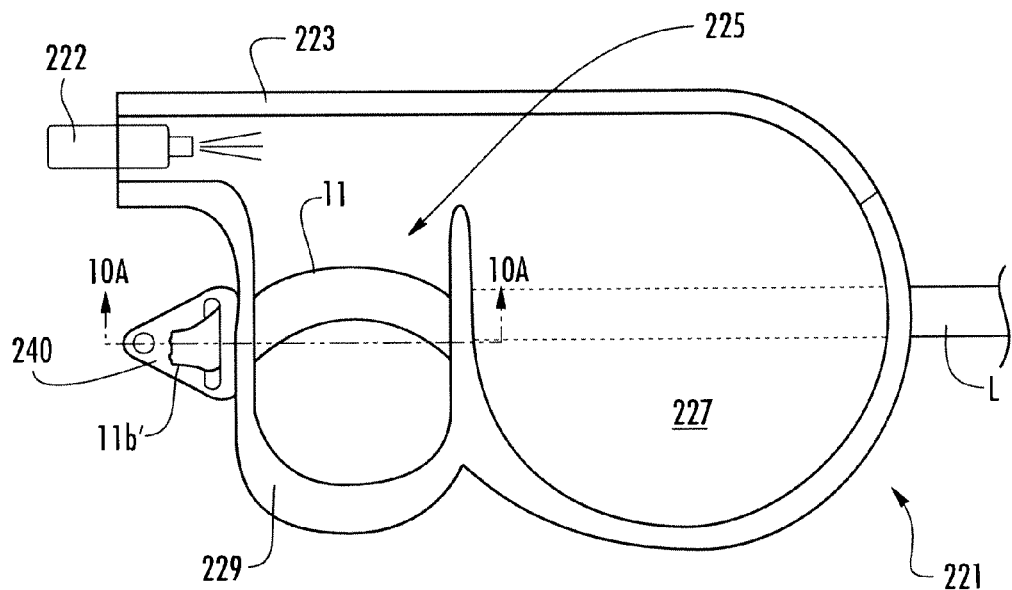
FIG. 10 is a side view of the integrated inflatable pretensioner and pelvis assembly of FIG. 8, shown inflated or deployed.
Figure 10A:
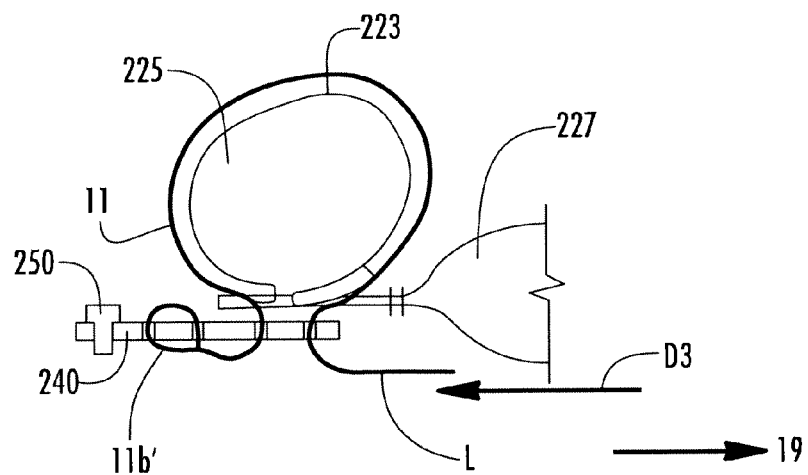
FIG. 10A is a cross-sectional view taken along line 10A-10A of FIG. 10.

The member (e.g., the member 240) may be made from steel or any suitable material strong enough to withstand the forces generated during a dynamic vehicle event where the occupant imparts loading forces into the seat belt webbing by restraining the occupant. As shown in FIGS. 9 and 9A, the member 240 may be substantially flat or may be formed to improve the structural rigidity of the member 240. The member 240 may include a plurality of slot-shaped openings or apertures (e.g., openings 241, 242, 243, 244) configured to allow the seat belt webbing 11 to pass therethrough. The member 240 may further include a round aperture or hole 245 to allow the anchoring fastener 250 to pass through to thereby couple and retain the member 240 to a vehicle component, such as the seat cushion frame or the floor panel. The anchoring fastener 250 may be any suitable fastener (e.g., bolt, screw, or rivet). Furthermore, the member 240 may include a flange and/or apertures to allow for coupling of the inflator 222 to the member 240. Alternatively, the inflator 222 may couple directly to any other vehicle component, such as the seat cushion frame or the floor panel.

Figure 14:
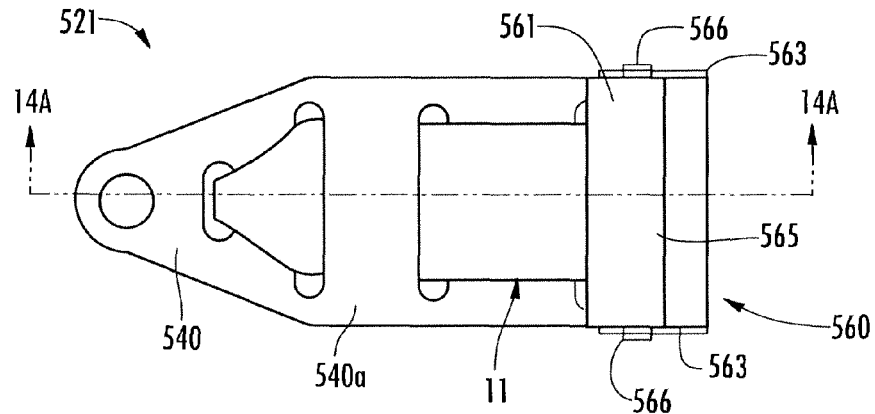
FIG. 14 is a top view of an exemplary embodiment of a locking mechanism coupled to a member for use with an inflatable pretensioner, such as the inflatable pretensioner of FIG. 4.
Figure 15:
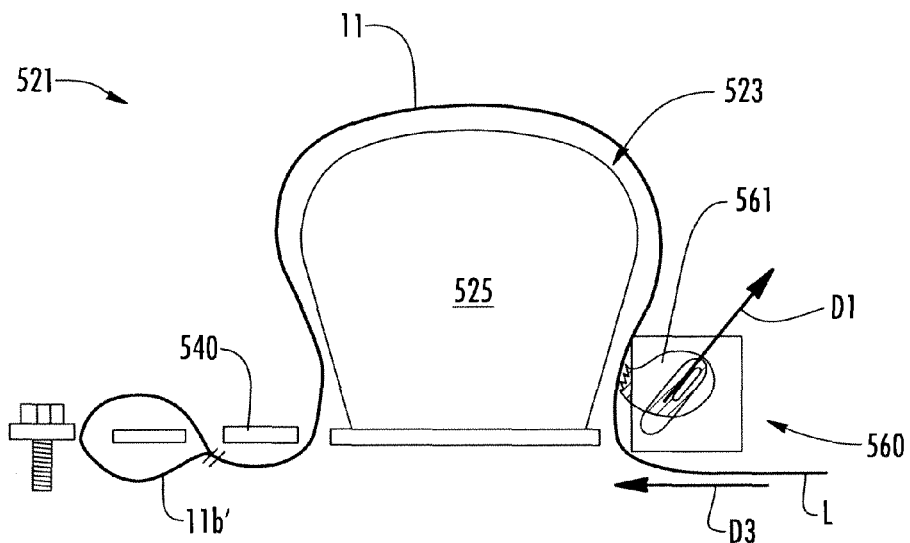
FIG. 15 is a side view of an inflatable pretensioner shown deployed with the locking mechanism configured in the unlocking position to allow pretensioning of the webbing.

As shown in FIGS. 14-15, the member 540 may include a base 540*a* (e.g., a flat portion) having a plurality of openings, which may be configured to receive the webbing 11, a fastener to couple the member 540 to another device or component, or any suitable element (e.g., the inflator, the cushion, etc.). The member 540 may also include a pair of opposing flanges 563 that extend substantially perpendicular from the base 540*a*, where the flanges 563 may be configured to receive a portion of a locking mechanism 560. For example, each flange 563 may include an opening (e.g., a slot) 564 that receives a portion of the locking mechanism 560.

As shown in FIGS. 20-22A, the member 640 may include a base 640*a* portion and a U-shaped portion 670 that extends from the base 640*a*. The U-shaped portion 670 of the member 640 may define a cavity 671 that has an opening 672 at the top of the cavity 671. The cavity 671 formed by the member 640 may be configured to house all or a portion of the stored airbag cushion 623, such as a first inflatable chamber of the cushion. The cavity 671 may also house the inflator 622 and have a feature (e.g., hole) to provide for attachment of the inflator 622 to the member 640. The airbag cushion 623 (or portion thereof) may deploy through the opening 672, such as, for example, to pretension the webbing 11 passing adjacent to the opening 672. It should be noted that the member may have any suitable shape and size and the embodiments disclosed herein are not meant as limitations.

FIGS. 11-13A illustrate another embodiment of an integrated airbag (e.g., pelvis) and inflatable pretensioner assembly 421 that includes an airbag cushion 423, an inflator 422 for inflating the cushion, a guide member 445 for routing the webbing and for providing structural support, and an anchor member 440 to couple to the webbing 11 and/or for anchoring the inflatable pretensioner assembly 421. The airbag cushion 423 may be configured as disclosed herein to include a first inflatable chamber 425 to provide pretensioning to the seat belt webbing 11. The airbag cushion may further include a second inflatable chamber 427 to provide protection or direct restraint to an occupant or a portion of the occupant, such as to the pelvic region of the occupant.

Figure 11:
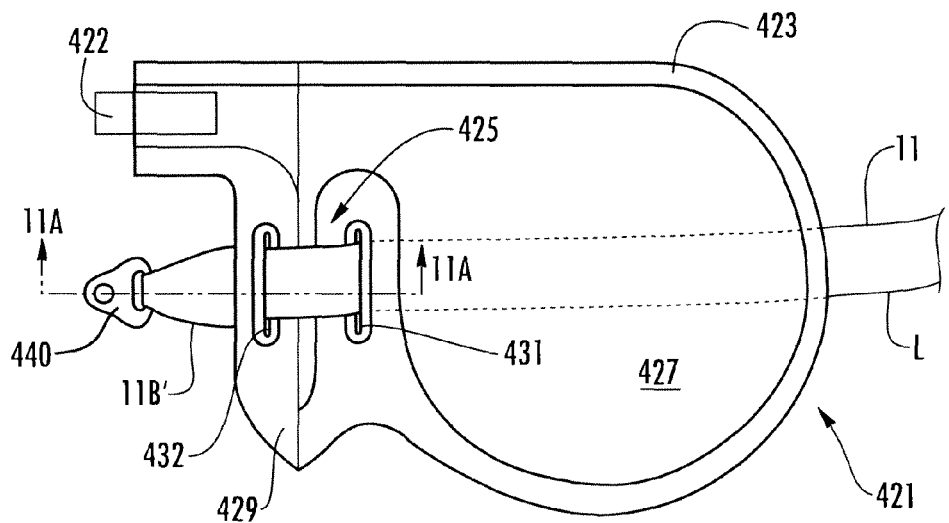
FIG. 11 is a side view of another exemplary embodiment of an integrated airbag (e.g., pelvis) and inflatable pretensioner assembly.
Figure 11A:
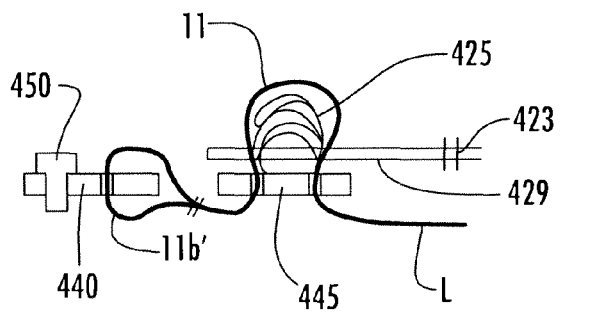
FIG. 11A is a cross-sectional view taken along line 11A-11A of FIG. 11, illustrating the first inflatable portion of the integrated airbag (e.g., pelvis) and inflatable pretensioner assembly folded or stored.

The guide member 445 may be substantially flat and may include a first slot-shaped opening 447 (e.g., aperture) and second slot-shaped opening 448 (e.g., aperture) configured to allow the seat belt webbing 11 to pass therethrough. The size and shape of the guide member 445 and openings 447, 448 therein may be varied in size and shape. The guide member 445 may include forms, flanges, or other features to improve strength or to improve function, such as to couple other components thereto. The first and second openings 447, 448 may relatively align with the first and second apertures 431, 432, respectively, in the airbag cushion 423, such as after manipulating the first inflatable chamber 425 of the cushion 423 into the stored configuration, to allow the webbing 11 to pass through and maintain a relative orientation between the cushion 423 and the guide member 445. The webbing 11 may route from the side of the airbag cushion 423 that is opposite the side having the stored (e.g., folded and/or rolled) first inflatable chamber 425 through the first opening 447 in the guide member 445 and the first aperture 431 in the cushion 423 to the side of the airbag cushion 423 having the first inflatable chamber 425, where the webbing 11 passes over and adjacent to the stored first inflatable chamber 425, then the webbing 11 passes through the second aperture 432 in the cushion 423 and the second opening 448 in the guide member 445, then may route adjacent to the guide member 445 on the side of the cushion that is opposite to the first inflatable chamber 425. As shown in FIG. 11, the second aperture 432 may be located in a non-inflatable region 429 of the airbag adjacent the perimeter of the airbag.

Figure 12:
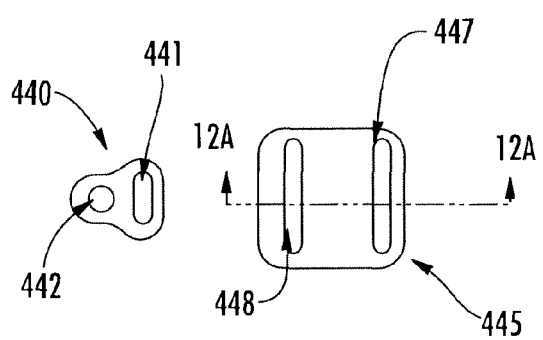
FIG. 12 is a side view of exemplary embodiments of an anchoring member and a guide member, for use in an integrated inflatable pretensioner and pelvis assembly.
Figure 12A:
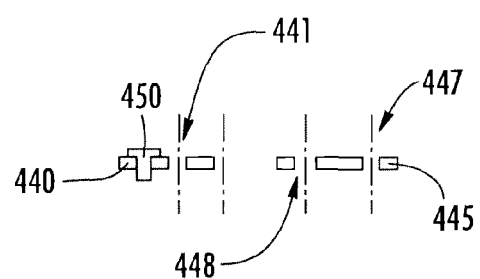
FIG. 12A is a cross-sectional view taken along line 12A-12A of FIG. 12.
Figure 13:
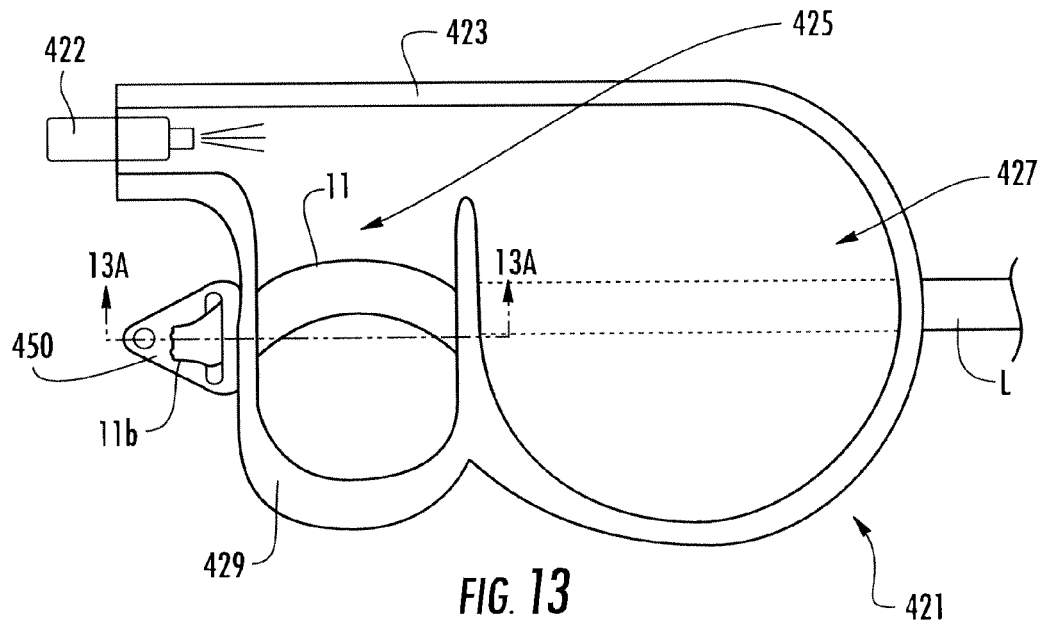
FIG. 13 is a side view of the integrated inflatable pretensioner and pelvis assembly of FIG. 11, shown inflated or deployed.
Figure 13A:
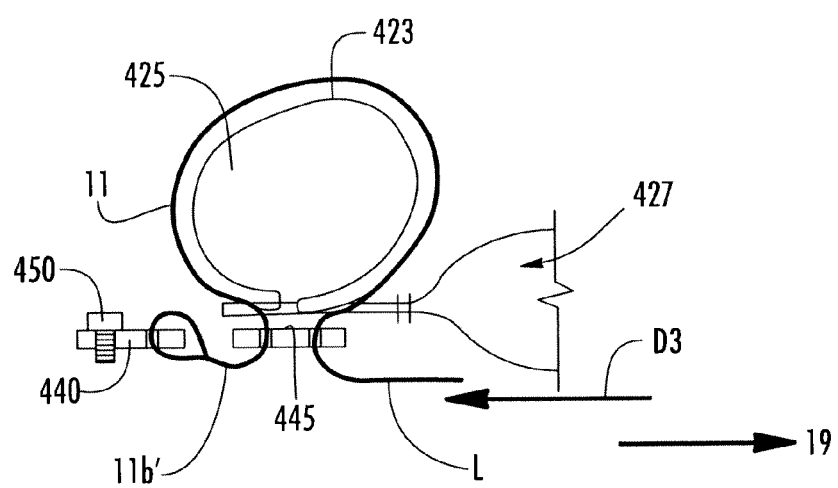
FIG. 13A is a cross-sectional view taken along line 13A-13A of FIG. 13.

As shown in FIGS. 12 and 12A, the anchor member 440 may be substantially flat and may include a first slot-shaped opening 441 (e.g., aperture) that is configured to allow the end of the seat belt webbing 11 to pass therethrough, and a second round opening 442 (e.g., aperture) to allow an anchoring fastener 450 to pass therethrough. The anchor member 440 may include forms, flanges, or other features to improve strength or to improve function, such as to couple other components (e.g., an inflator) thereto. The round opening 442 may receive a fastener 450 to couple and retain the anchor member 440 to a vehicle component, such as the seat cushion frame or the floor panel. The anchoring fastener 450 may be any suitable fastener (e.g., bolt, screw, or rivet). The end 11b' of the webbing 11 may be fixed to the anchor member 440. For example, the webbing 11 may form a loop by passing through the slot shaped opening 441 in the anchor member 440, whereby the end 11b' of the webbing 11 may be coupled (e.g., by stitching) to a portion of the webbing 11. The webbing 11 may also be coupled directly to the anchor member 440 without the webbing 11 forming a loop, such as by having a fastener couple the webbing 11 to the member 440.

During a dynamic vehicle event triggering pretensioning of the seat belt webbing 11, the inflator (e.g., the inflator 222) is activated, which begins producing inflation gas to expand the airbag cushion (e.g., the airbag cushion 223). According to an exemplary embodiment, the inflation gas fills the first inflatable chamber (e.g., the first inflatable chamber 225), increasing the internal pressure of the first inflatable chamber, which expands and unfolds the stored first inflatable chamber. Because the webbing routes over the top of the first inflatable chamber (e.g., the first inflatable chamber 225) of the airbag cushion (e.g., the airbag cushion 223), the expansion (i.e., the increase in cross-sectional profile, such as the circumference shown in FIGS. 10A, 13A, and 22) of the first inflatable chamber forces the length of webbing circumscribing the expanding first inflatable chamber of the airbag cushion to increase correspondingly. The fixed end 11b' of the webbing 11 is unable to give up any substantial length (only a minor length of webbing due to clearances and slack can be removed) of webbing 11 to circumscribe the expanding first inflatable chamber (e.g., the first inflatable chamber 225), therefore, the webbing pretensioning portion (i.e., the portion that extends away from the first inflatable chamber and forms the lap portion L of the webbing 11) is forced to displace toward the first inflatable chamber (e.g., the first inflatable chamber 225) to provide the length of webbing necessary to circumscribe the expanding airbag cushion. This displacement of the lap portion L of the webbing 11 toward the first inflatable chamber (e.g., the first inflatable chamber 225) acts to retract the webbing toward the fixed end 11b' of the webbing 11, which removes the clearances and slack in the webbing, such as the slack between the webbing and the restrained occupant. Thus, by having an internal pressure greater than the tension force in the webbing, the expanding first inflatable chamber (e.g., the first inflatable chamber 225) pretensions the webbing 11 by forcing the webbing 11 to circumscribe the increasing profile (e.g., circumference) of the expanding first inflatable chamber (e.g., the first inflatable chamber 225), which displaces the webbing 11 in a direction that removes the clearance between the webbing and the occupant.

The length of the webbing 11 extracted (i.e., moved, taken up) during the pretensioning may be controlled by the dimensions (e.g., circumference) of the outer profile of the first inflatable chamber (e.g., the first inflatable chamber 225) of the airbag cushion (e.g., the airbag cushion 223). Thus, the length of the webbing 11 extracted during the pretensioning may be tailored by varying the dimensions of the outer profile of the first inflatable chamber (e.g., the first inflatable chamber 225). The dimensions of the outer profile may be varied by changing the profile of the inflated chamber (e.g., the first inflatable chamber 225) when fully inflated, or may be varied by changing the amount of inflation gas used to inflate the first inflatable chamber (i.e., less inflation gas would inflate the inflatable chamber to a smaller circumference or profile length).

The airbag cushion of the inflatable pretensioner may be configured such that inflation gas may fill both the first inflatable chamber and the second inflatable chamber, where the gas may fill both chambers substantially simultaneously, in series, or in any suitable progression. The airbag cushion may also be configured to include any number of chambers, which may have any suitable progression of inflation or deployment.

The occupant restraint (or protection) system 20 and/or the inflatable pretensioner, such as the inflatable pretensioner 521 shown in FIGS. 14-15, may further include a locking member or locking mechanism 560 to prohibit the webbing 11 from extracting (i.e., moving in a direction to increase slack or clearance between the webbing and the occupant, which would be opposite to the pretensioning direction) during a vehicle dynamic event. According to an exemplary embodiment, the locking mechanism 560 may allow the webbing to be extracted or retracted during normal vehicle use (i.e., not a dynamic-impact or rollover event), such as for the occupant 19 to adjust the webbing 11 for comfort. However, during a vehicle dynamic impact event, the webbing 11 may only be allowed to be retracted for pretensioning and is prohibited from being extracted. Thus, during a dynamic impact event, the slack (i.e., clearance between occupant and webbing) may be removed, such as by the pretensioning by the first inflatable chamber 525 of the airbag cushion 523, yet the slack removed during such pretensioning may not be given up (or extracted), since the locking mechanism 560 prohibits the webbing 11 from being extracted. The locking mechanism 560 may be configured to allow for the webbing to be extracted during normal vehicle usage (i.e., not during a sudden dynamic change to the vehicle), to allow for comfort adjustment for the restrained occupant.

Figure 16:
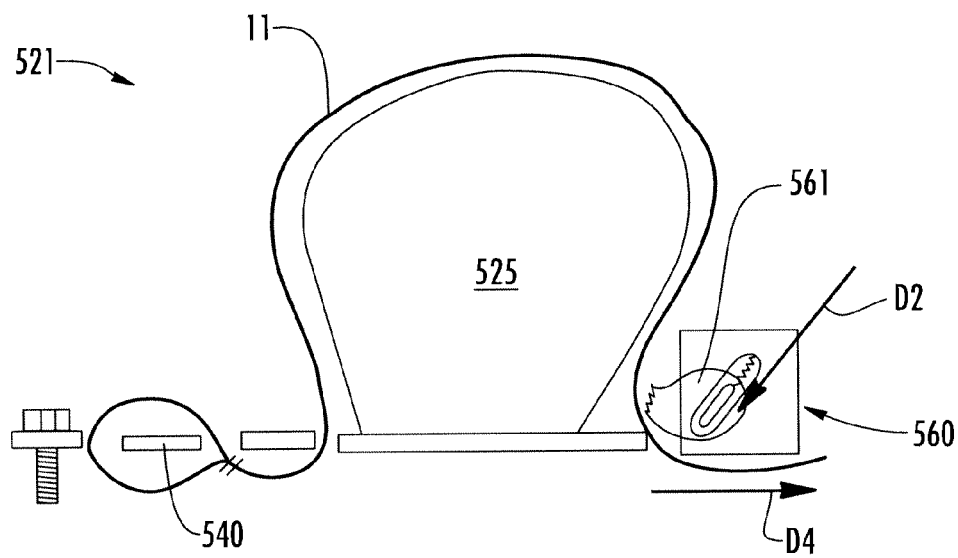
FIG. 16 is a is a side view of an inflatable pretensioner shown deployed with the locking mechanism configured in the locking position to prohibit extraction of the webbing.

As shown in FIGS. 14-16, the locking mechanism 560 may be integrated with the member 540 of the inflatable pretensioner 521, where the member 540 may be configured to anchor the inflatable pretensioner 521, as disclosed herein. The locking mechanism 560 may include a sliding bar 561 and a biasing member 562 (e.g., spring). The locking mechanism 560 may also include two opposing flanges 563 with each flange 563 having a slot 564 configured to receive a portion of the sliding bar 561. The slot 564 may be configured to allow the sliding bar 561 to displace along the length of the slot 564 in the non-locking (or open) direction, which is shown by the arrow labeled D1 in FIG. 15, and in the locking (or closed) direction D2, which is opposite the direction D1, as shown in FIG. 16. The locking mechanism 560 is configured to have two positions, a first locking (or closed) position and a second non-locking (or open) position. When the locking mechanism 560 is configured in the first locking position, the webbing 11 of the occupant restraint system 20 is prohibited from sliding in a direction D4, as shown in FIG. 16, yet may slide in a direction D3. Thus, the webbing 11 may be pretensioned (e.g., moved in the direction D3) by the expanding cushion 523 (e.g., first inflatable chamber 525) to remove slack between the webbing 11 and the secured occupant being restrained by the webbing 11, but the webbing 11 is prohibited from sliding in the direction D4 that would release the pretensioning and add slack between the webbing 11 and the secured occupant. When the locking mechanism 560 is configured in the second non-locking position, the webbing 11 of the occupant restraint system 20 is allowed to freely slide in either the direction D3 or D4.

Figure 14A:
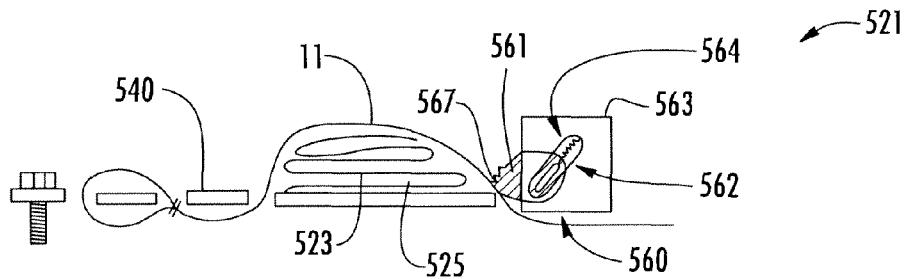
FIG. 14A is a cross-sectional view of the locking mechanism of FIG. 14 taken along line 14A-14A.

As shown in FIGS. 14 and 14A, the sliding bar 561 may include a body 565 that may be provided between the two opposing flanges 563 of the member 540 and an extension 566 extending from each end of the body 565. The extension 566 is configured for engaging the slot 564 in the flange 563 of the member 540, such that the extension 566 may displace along the length of the slot 564 as the body 565 moves in the direction D1 or the direction D2. Thus, the sliding bar 561 may displace along the length of the slot 564 as the two extensions 566 slide within the two slots 564. The sliding bar 561 may further include an engaging portion 567 that is configured to engage the webbing 11 to lock the webbing 11 in place. For example, the engaging portion 567 may include a plurality of teeth configured to engage the webbing 11, such that the portion of the webbing 11 engaged is prohibited from sliding (e.g., extracting, retracting) relative to the sliding bar 561. In other words, the engaging portion 567 may pinch the webbing 11 between the sliding bar 561 and the member 540 to prohibit movement of the webbing 11 relative to the locking mechanism 560.

Figure 20:
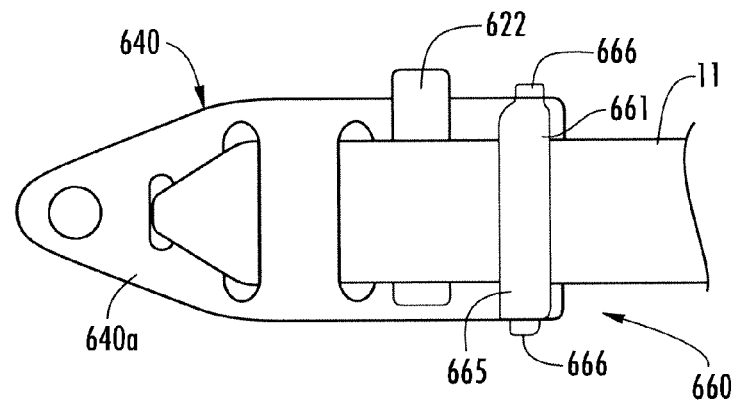
FIG. 20 is a side view of the member of the inflatable pretensioner of FIG. 17, shown having the inflator and locking mechanism coupled thereto.
Figure 21:
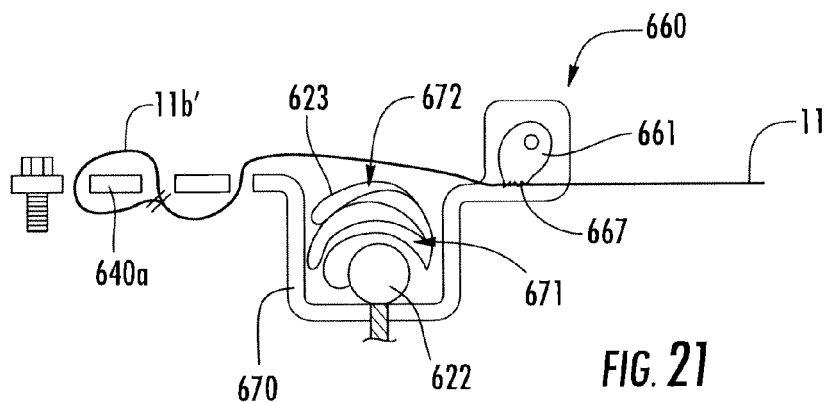
FIG. 21 is a cross-sectional view taken along line 21-21 of FIG. 18.

As shown in FIGS. 20-22, the locking mechanism 660 may include a rotating bar 661 that is configured to selectively rotate about a pivot axis in order to lock (e.g., clamp) a section of the webbing 11. The rotating bar 661 may be configured with a body 665 and with ends 666 that are smaller in diameter relative to the body 665, where the ends 666 engage holes in the member 640, such as holes in the flanges of the member 640, that define the pivot axis of the rotating bar 661. The rotating bar 661 may further include an engaging portion 667 that is configured to engage a section of the webbing 11 to retain the section and prevent movement of the webbing 11 relative to the locking mechanism 660.

The biasing member (e.g., biasing member 562) may be a spring (e.g., a coil spring, extension spring) that imparts a biasing force onto the sliding bar 561 of the locking mechanism 560, such that the biasing member 562 biases the sliding bar 561 into the locking position (i.e., into contact with the webbing 11). The biasing member 562 may be configured to be any suitable spring or device that provides a biasing force. The biasing member 562 may also be configured to bias the sliding bar 561 in any suitable direction (e.g., in a non-locking direction, in a locking direction).

During deployment of the inflatable pretensioner (e.g., inflatable pretensioner 521), such as inflatable pretensioner 521, the first chamber 525 of the airbag cushion 523 expands in a direction away from the member 540, as shown in FIG. 15, and accordingly pulls the section of webbing 11 that is adjacent to the expanding first chamber 525 with the cushion, imparting a tension into the webbing 11. In effect, as the inflating cushion 523 (e.g., the first chamber 525) expands, the outer profile or periphery (e.g., diameter) of the cushion 523 increases in length (e.g., circumference), thereby forcing the length of the webbing 11 that is adjacent to the cushion 523 (e.g., first inflatable chamber 525) to increase in length a similarly corresponding amount. However, because the webbing 11 has the end 11b' fixed (e.g., coupled to the member 540), the additional length of the webbing 11 required to at least partially circumscribe the expanding periphery of the cushion 523 is primarily taken from the lap portion L and/or the shoulder portion S of the webbing 11, thereby removing the clearance (or slack) between the webbing 11 and the secured occupant that was present prior to deployment. In other words, the expanding cushion 523 operates to retract or move the webbing 11 in the pretensioning direction D3 relative to the locking mechanism 560 to pull the webbing 11 tight to reduce the slack between the webbing 11 and occupant to improve restraint of the secured occupant.

The forces from the expanding cushion 523 and the retracting of the webbing 11 overcome the biasing force from the biasing member 562, which causes the sliding bar 561 to move (e.g., displace, slide) in the direction D1 to the open (or non-locking or unlocked) position, which permits the webbing 11 to continue to retract (i.e., move in the pretensioning direction D3) during inflation and expansion of the airbag cushion 523. The retracting of the webbing 11 provides pretensioning to the seated occupant by removing the slack or clearance between the restrained occupant and the webbing 11 of the active restraint system.

After the occupant contacts the webbing 11, the loads induced by the accelerating occupant are transferred into the webbing 11 as forces opposing the pretensioning forces on the webbing, which act in the direction to extract (or unwind) the webbing 11. The opposing forces may overcome the pretensioning forces that act to position the sliding bar 561 of the locking mechanism 560 in the open position, such that the biasing member 562 and/or the loading on the webbing from the occupant cause the sliding bar 561 to move (e.g., displace, slide) in the direction D2 to the locking position, thereby prohibiting extraction (e.g., movement in the direction D4) of the webbing 11 relative to the locking mechanism 560.

The locking mechanism 560 (e.g., locking member) may be driven into the locking position (e.g., during a vehicle impact event) to prevent extraction of the seat belt webbing 11 through a force from the biasing member 562 (e.g., spring), by inertia of the vehicle (e.g., sudden deceleration of the vehicle), or by any suitable method. When configured in the locking position, the locking mechanism 560 may allow for further retraction or pretensioning (i.e., movement of in the pretensioning direction D3) of the webbing 11, such as by a pretensioning device, yet may prohibit extraction or unwinding (i.e., movement in the direction D4) of the webbing 11, so that slack or clearance removed by the pretensioning device between the occupant and the seat belt webbing 11 may not be reclaimed by forces imparted by the occupant onto the webbing 11. It should be noted that other suitable locking mechanisms may provide for selective clamping (or locking) of the webbing 11 during operation and that the locking mechanisms illustrated herein are not meant as limitations.

The inflatable pretensioners of the occupant restraint (or protection) systems, as disclosed herein, that have more than one inflatable chambers may utilize a single inflator (e.g., the inflator 222, the inflator 322, etc.) to inflate the more than one inflatable chamber, or may include more than one inflator to inflate the different chambers. As shown in FIG. 7, for example, the inflatable pretensioner 221 may include a single inflator 222 that is configured to inflate both the first inflatable chamber 225 to pretension the seat belt webbing 11 and the second inflatable chamber 227 to further restrain or protect the secured occupant or a portion (e.g., the pelvis) of the occupant. Thus, during a dynamic vehicle event triggering activation of the inflator, the inflation gas generated may expand and inflate one or more inflatable chambers of the airbag cushion. As shown in FIG. 6, the airbag cushion 323 may be configured so that inflation gas must pass through the first inflatable chamber 325 to enter the second inflatable chamber 327. Alternatively, as shown in FIGS. 7, 8, 10, 11 and 13, the airbag cushions of the inflatable pretensioners may be configured so that inflation gas may pass into more than one chamber substantially simultaneously. It should be noted that the inflatable pretensioners, as disclosed herein, may include any number of inflatable chambers, which may be inflated by the same or a separate inflator and may be inflated in series or in parallel to the other inflatable chambers of the airbag cushion.

As shown in FIG. 17, the inflatable pretensioner 621 may include an inflator 622 that is positioned transverse to the direction of the webbing 11, or, as shown in FIG. 6, may include an inflator 322 that is positioned parallel to the direction of the webbing 11. It should be noted that the inflator may be positioned at any suitable orientation or may be located anywhere on the inflatable pretensioner, and the embodiments disclosed herein are not meant as limitations.

It should also be noted that the active occupant restraint systems, as disclosed herein, may be configured to include both an integrated airbag cushion (e.g., pelvis cushion) and an inflatable pretensioner, as shown in FIG. 5, or may be configured to include solely an inflatable pretensioner, such as shown in FIG. 4. The latter embodiment shown in FIG. 4 may include an airbag cushion having an inflatable portion configured similar to the first inflatable portions of FIGS. 6 and 7, but without any additional inflatable chambers (or portions). The inflator of this embodiment may be smaller in size and may be configured to produce less inflation gas relative to the inflator used in the embodiment of FIGS. 6 and 7, which may allow for a reduced mass and cost. The airbag cushion of the occupant safety system having only an inflatable pretensioner may further include apertures or slits to allow the webbing to pass through and may include a member to anchor and provide structural rigidity to the airbag assembly.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant safety systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant restraint system configured to provide restraint to a secured occupant of a vehicle, the restraint system comprising:
   a seat belt webbing having a first end and a second end, the webbing configured to restrain the occupant;
   a member for anchoring the second end of the webbing; and
   an inflatable pretensioner having an inflator and an inflatable cushion that includes a first inflatable chamber and a second inflatable chamber,
   wherein the inflator is configured to inflate the first and second chambers of the cushion;
   wherein the first inflatable chamber is configured to deploy upon inflation to provide pretensioning of the webbing to restrain the secured occupant;
   wherein the second inflatable chamber is configured to deploy upon inflation to restrain the occupant;
   wherein the inflatable cushion includes an aperture between the first and second chambers, and
   wherein the webbing is located on the exterior of the inflatable chambers and passes through the aperture so that the webbing is positioned between the second inflatable chamber and the occupant.

2. The restraint system of claim 1, further comprising a device coupled to the first end of the webbing to provide selective locking of the first end of the webbing.

3. The restraint system of claim 2, wherein the device is a retractor mechanism.

4. The restraint system of claim 1, wherein the first inflatable chamber of the cushion pretensions the webbing by moving a section of the webbing located between the first and second ends to impart a tension onto the webbing.

5. The restraint system of claim 4, wherein the section of the webbing is provided along a lap portion of the webbing.

6. The restraint system of claim 4, wherein the section of the webbing at least partially circumscribes at least a portion of the first inflatable chamber, such that as the first inflatable chamber inflates and expands the length of the section of the webbing that circumscribes the first inflatable chamber increases to thereby increase the tension in the webbing.

7. The restraint system of claim 1, wherein the second inflatable chamber is configured to deploy to restrain the pelvis of the occupant.

8. The restraint system of claim 7, wherein the second inflatable chamber is in direct fluid communication with the first inflatable chamber.

9. The restraint system of claim 1, wherein the inflatable pretensioner is coupled to the member.

10. The restraint system of claim 1, wherein the inflatable pretensioner includes a locking mechanism to selectively clamp a section of the webbing to prohibit movement of the webbing relative to the locking mechanism.

11. The occupant restraint system of claim 1, wherein the inflatable cushion includes an inner panel, an outer panel, and one or more intermediate panels coupled to and extending between the inner panel and the outer panel such that the inflatable cushion defines the first and second inflatable chambers;
   wherein the one or more intermediate panels are coupled to the inner panel in a region where the aperture is located;
   wherein the one or more intermediate panels are coupled to the outer panel in a region where a second aperture is located; and
   wherein the second aperture is between the first and second chambers, and the webbing passes through the second aperture.

12. An inflatable pretensioner configured to pretension a seat belt webbing of an occupant restraint system to thereby improve restraint of an occupant secured thereto, the inflatable pretensioner comprising:
   an inflatable cushion that includes at least one inflatable chamber and at least one non-inflatable portion; and
   an inflator for inflating the at least one chamber of the cushion;
   wherein the at least one non-inflatable portion includes an aperture;
   wherein the webbing passes through the aperture to slideably couple the cushion to the webbing, such that the orientation of the webbing in a direction transverse to the length of the webbing is maintained relative to the at least one chamber and the webbing is located on a first side of the inflatable cushion adjacent the at least one inflatable chamber and is located on a second side of the inflatable cushion adjacent a second inflatable chamber;
   wherein the aperture is between the at least one inflatable chamber and the second inflatable chamber;
   wherein the first and second sides of the inflatable cushion are opposite sides;
   wherein inflation of the at least one inflatable chamber provides pretensioning of the webbing to restrain the secured occupant;
   and wherein inflation of the second chamber of the inflatable cushion provides protection for a pelvic region of the occupant.

13. The inflatable pretensioner of claim 12, wherein the inflatable chamber of the cushion pretensions the webbing by moving a section of the webbing located between the ends of the webbing to impart a tension onto the webbing.

14. The inflatable pretensioner of claim 13, wherein the section of the webbing is provided along a lap portion of the webbing that is configured to restrain the lap of the secured occupant.

15. The inflatable pretensioner of claim 13, wherein the section of the webbing at least partially circumscribes at least a portion of the first inflatable chamber, such that as the first inflatable chamber inflates and expands the length of the section of the webbing that circumscribes the first inflatable chamber increases to thereby increase the tension in the webbing.

16. The inflatable pretensioner of claim 15, wherein the section of webbing abuts the portion of the inflatable chamber being at least partially circumscribed.

17. The inflatable pretensioner of claim 12, wherein the inflatable cushion is configured such that inflation gas enters the second chamber from the first chamber to thereby inflate the second chamber after inflating the first chamber.

18. The inflatable pretensioner of claim 12, further comprising a member to anchor an end of the webbing that is near the inflatable pretensioner.

19. The inflatable pretensioner of claim 12, further comprising a locking mechanism to selectively clamp a section of the webbing to prohibit movement of the webbing relative to the locking mechanism.

* * * * *